INVENTORS.
RICHARD V. JONES and
ALAN B. SMITH
BY Harry A. Herbert Jr.
Sherman H. Goldman
ATTORNEYS

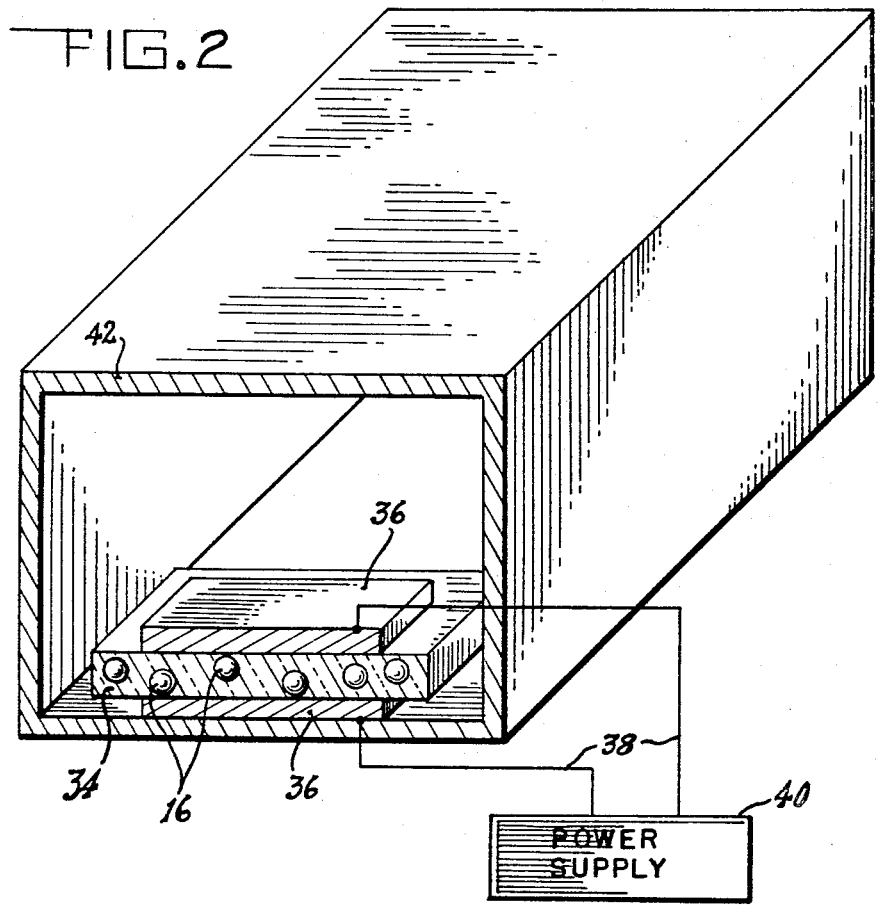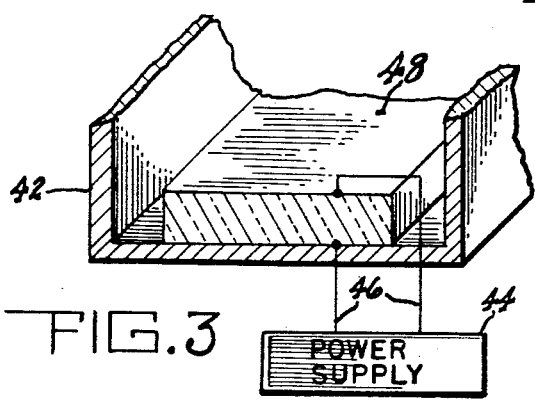

United States Patent Office 3,398,382
Patented Aug. 20, 1968

3,398,382
CAPACITIVELY DRIVEN MICROWAVE MODULATORS
Richard V. Jones, Arlington, and Alan B. Smith, Belmont, Mass., assignors to the United States of America as represented by the Secretary of the Air Force
Filed July 28, 1965, Ser. No. 475,615
9 Claims. (Cl. 332—29)

ABSTRACT OF THE DISCLOSURE

An ultra high frequency modulator to be located at a point of ferromagnetic resonance along a waveguide including spherically shaped ferromagnetic material and means for applying a strain to the sphere sufficient to cause a shift in ferromagnetic resonance.

---

This invention relates generally to microwave modulators and more specifically to a microwave modulator which simultaneously uses the properties of piezoelectricity and ferromagnetism to take advantage of the strain or orientation dependent properties of a gyromagnetic media.

It is well known that a ferrite body exposed to an alternating magnetic field at a frequency $v$ becomes highly absorptive and dispersive in a region near ferromagnetic resonance (hereinafter called FMR). The FMR frequency of any magnetic material is a direct function of the magnetocrystalline anisotropy which in turn is a function of the state of strain of the substance. Thus, an applied strain will displace the resonance frequency and alter the microwave properties of any ferrite causing a change in the transmission characteristics of a microwave cavity containing the ferrite and ultimately producing microwave modulation.

In the past, a number of types of microwave modulators have been obtained by applying modulation signals to the biasing D.C. magnetic field and thus shifting the conditions for FMR. In the case of a spherically shaped body, for example, FMR is achieved by applying a D.C. magnetic field $H=v/R$ (R is approximately 2.80 mc./s./gauss for most materials) at right angles to the alternating field. This effect has been used extensively in microwave technology to obtain selective loss characteristics and phase shifts. Although such devices are useful they are usually limited to low frequencies of modulation due to the difficulties of driving the inductive windings of the modulation coils at high frequencies. Another disadvantage of the prior art devices is that they are usually bulky and consume large amounts of electrical power.

The present invention is based on the fact that FMR conditions may be modulated by varying the state of strain of a ferrite body. If this strain were produced by a piezoelectric transducer attached to the ferrite, the modulator would be activated as a capacitive element. Capacitive drive would have the advantages of negligible power consumption, reduced bulk and high modulation rates, along with the further advantage of fast time response where a piezoelectric element is driven as a capacitance.

An immediate practical application of this invention is seen in the artificial earth satellite, where weight and power consumption are of critical importance and modulation of microwave transmission is sometimes extremely important.

It is therefore an object of this invention to provide a new and more efficient method and apparatus for the modulation of microwaves.

It is a further object of this invention to provide an apparatus for modulating microwaves which is of reduced bulk from any hitherto known.

It is another object of this invention to provide a microwave modulator which has negligible power consumption.

It is still another object of this invention to provide a microwave apparatus with higher modulation rates than any similar device hitherto known.

It is still a further object of this invention to provide a modulator which is activated as a capacitive element.

It is another object of this invention to provide a microwave modulator which operates at resonant frequency.

It is another object of this invention to provide a microwave modulator which causes a shift in resonant frequency.

It is still another object of this invention to provide an apparatus which modulates waves of radio frequency with piezoelectric elements driven as a capacitance.

These and other advantages, features and objects of the invention will become more apparent from the following description taken in connection with the illustrative embodiments in the accompanying drawings, wherein:

FIGURE 2 is a sectional view of a wave guide and another embodiment of the modulating means provided for in this invention; and FIGURE 3 is a sectional view of another embodiment of this invention.

Figure 1:
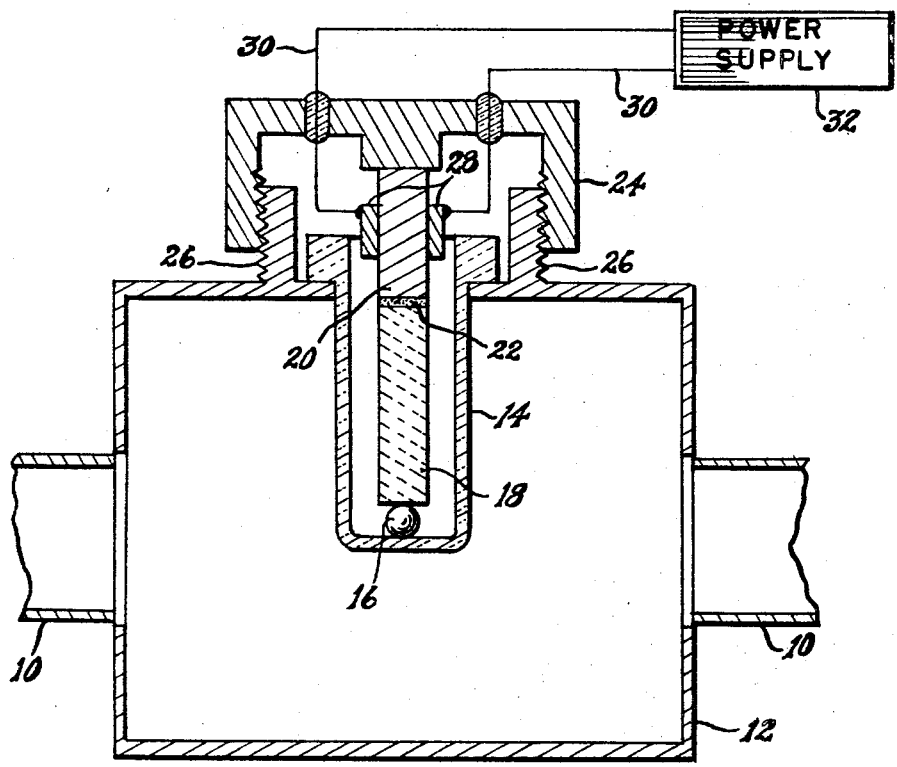
FIGURE 1 is a sectional view of a wave guide resonance cavity and the means for modulating microwaves as provided for in this invention.

To determine the D.C. field required for resonance as a function of applied stress expressions may be taken from the theory of FMR. For cubic simple crystals and spherical samples particularly simple results are found. If a uniaxial stress, $F/A$, is applied along the $[1\bar{1}0]$ crystalline direction the change in the field for resonance, $\delta H$, measured along, respectively, the $[100]$ and $[110]$ directions is given by:

$$(\delta H)_{100} = (3/2)(1/M_0)(F/A)\lambda_{100}$$

$$(\delta H)_{110} = (3/4)(1/M_0)(F/A)(3\lambda_{111} - \lambda_{100})$$

where the $\lambda$'s are the usual magnetostrictive constants and $M_0$ is the saturation magnetization. For typical ferrite materials the magnetostrictive constants range over values from about $2 \times 10^{-6}$ to over $6 \times 10^{-4}$. With well designed piezoelectric transducers, one might expect to find maximum shifts in the resonance of 5 to 1000 oersteds. However, the important consideration is the size of any magnetoelastic shift relative to the intrinsic width of the resonance line. In order to have any appreciable modulation effect, the piezoelectric transducer must be able to produce shifts of the order of a line width.

In general, there is a rough correlation between the size of the magnetostrictive constants and the width of the resonance line. The compound yttrium iron garnet (hereinafter referred to YIG), for example, at room temperature would have a maximum predictable shift of about 10 oersteds, compared to a minimum line width of about 0.3 oersted. Thus a shift of about 30 times the resonance width might be possible. The compound nickel ferrite would have a maximum shift of about 100 oersteds and minimum width of about 5 oersteds. From this point of view nickel ferrite would appear to be less suitable as a modulator material than YIG.

Referring now to FIGURE 1, there is shown a resonance cavity 12 located along the wave guide 10. Inserted through the top of the resonance cavity is a re-entrant quartz tube 14 closed at one end. A sphere of modulator material 16 is placed at the bottom or closed end of the tube. The modulator material may be of the compound yttrium iron garnet, nickel ferrite or nickel cobalt ferrite each working substantially as well for the purpose intended.

A single crystal, quartz or sapphire, plunger 18 is pressed against the modulator sphere by the transducer 20. The transducer is preferably a piezoelectric material because of its low intrinsic microwave loss although a ferroelectric material could be utilized. The plunger 18 is separated from the transducer 20 by a material 22. Pressing down on the transducer and ultimately causing pressure on the modulator sphere is an insulated plug 24 mating with a threaded joint 26 on the outside of the resonance cavity. If all contact surfaces are ground for good mechanical contact, the strains produced in the plunger by the transducer will be transmitted to the sample. There will be an amplification of the strain if the cross-section area and the length of the transducer exceed those of the sample. The electrodes 28 are attached to the transducer at a point outside the resonance cavity for minimum microwave loss. The electrodes are connected by wires 30 to a power supply 32.

Where the transducer is a piezoelectric material the plunger and transducer may be of unitary construction in which case there would be no need for the insulator 22.

In operation, as an electric field is applied to the transducer, it will expand squeezing the sample material, which, as hereinbefore explained will change the dispersive and absorptive properties of the microwave cavity at ferromagnetic resonance, and capacitively cause modulation of the waves passing therethrough.

In FIGURE 2 there is shown another embodiment of this invention whereby the ferromagnetic modulator material 16 is embedded in a piezoelectric ceramic matrix 34. The electric field is produced by the electrodes 36 which are in turn supplied current through leads 38 from power supply 40. The modulating device is located within the wave guide 42 and as hereinbefore explained modulates the microwaves by applying a strain to the ferrite body and causing a shift in the FMR.

The matrix may be formed by mixing yttrium iron garnet with powdered barium titanate and firing the mixture at a high temperature. The YIG crystals might be oriented by applying a strong magnetic field during the pressing of the original mixture, if so desired.

Alternatively, this invention may be utilized as shown in FIGURE 3 whereby the modulator material itself is piezoelectric and simultaneously ferromagnetic. If the compound gallium ferrite ($GaFeO_3$) or a similar material were utilized, the electric field caused by current from the power supply 44 transferred through leads 46 would produce the strain directly in the modulator material 48 and an additional transducer would not be required.

The application of an electric field directly to this material would again change the dispersive and absorptive properties of the microwave cavity at FMR and capacitively cause modulation of the waves passing therethrough.

Although the invention has been described with reference to a particular embodiment, it will be understood to those skilled in the art that the invention is capable of a variety of alternative embodiments within the spirit and scope of the appended claims.

We claim:

1. A modulator for ultra high frequencies comprising: a wave guide for transmitting high frequency waves; a cavity located along the wave guide at a point of ferromagnetic resonance; a tube, closed at one end entering said cavity; a spherically shaped quantity of ferromagnetic material placed at the closed end of said tube within the cavity; means for applying a constant strain on said ferromagnetic material; and electrical means for applying additional strain on said material to cause a shift in ferromagnetic resonance and modulation of the high frequency waves.

2. A modulator according to claim 1 wherein said tube is quartz.

3. A modulator according to claim 2 wherein the means for applying constant pressure comprises a cap screw exerting pressure through a plunger.

4. A modulator according to claim 3 wherein the electrical means for applying additional strain is a piezoelectric transducer.

5. A modulator according to claim 1 wherein said ferromagnetic material is the compound yttrium iron garnet.

6. A modulator according to claim 1 wherein said ferromagnetic material is nickel ferrite.

7. A modulator according to claim 1 wherein said ferromagnetic material is the compound nickel cobalt ferrite.

8. A modulator according to claim 1 wherein the electrical means for applying additional strain is a ferromagnetic transducer.

9. A modulator for ultra high frequencies comprising: a wave guide for transmitting high frequency waves; a plurality of spherically shaped quantities of ferromagnetic material located in said wave guide at a point of ferromagnetic resonance; means surrounding said material and causing a strain thereon; and electric means juxtaposed to said surrounding means for causing additional strain on said ferromagnetic material and causing a shift in ferromagnetic resonance and modulation of high frequency waves.

References Cited

UNITED STATES PATENTS 3,235,819     2/1966     Carvelas et al. _____ 333—24.1 X

ROY LAKE, *Primary Examiner.*

L. J. DAHL, *Assistant Examiner.*